(12) United States Patent
Yumisashi et al.

(10) Patent No.: US 8,972,154 B2
(45) Date of Patent: Mar. 3, 2015

(54) ENGINE STOP DETERMINATION DEVICE AND ENGINE STOP DETERMINATION METHOD

(75) Inventors: Naoto Yumisashi, Nagoya (JP); Masazumi Yoshida, Handa (JP); Shigeki Kinomura, Suntou-gun (JP)

(73) Assignees: Aisin Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 479 days.

(21) Appl. No.: 13/505,096

(22) PCT Filed: Oct. 13, 2010

(86) PCT No.: PCT/JP2010/067964
§ 371 (c)(1),
(2), (4) Date: Apr. 30, 2012

(87) PCT Pub. No.: WO2011/055616
PCT Pub. Date: May 12, 2011

(65) Prior Publication Data
US 2012/0215429 A1   Aug. 23, 2012

(30) Foreign Application Priority Data

Nov. 5, 2009   (JP) .................................. 2009-253871

(51) Int. Cl.
*G06F 19/00*   (2011.01)
*G06G 7/70*   (2006.01)
(Continued)

(52) U.S. Cl.
CPC .............. *F02D 29/02* (2013.01); *B60W 10/02* (2013.01); *B60W 10/06* (2013.01); *B60W 10/08* (2013.01);
(Continued)

(58) Field of Classification Search
CPC .. Y02T 10/48; F02N 2200/023; B60W 10/06; B60W 2510/0676; B60L 2240/445

USPC ................ 62/323.1; 123/41.14, 179.3, 179.4; 701/112, 113, 114, 22, 36, 99; 180/65.21, 65.265

See application file for complete search history.

(56) References Cited

U.S. PATENT DOCUMENTS 6,532,926 B1 *   3/2003   Kuroda et al. ............. 123/179.4
(Continued)

FOREIGN PATENT DOCUMENTS

EP       1 571 022 A1      9/2005
(Continued)

OTHER PUBLICATIONS

Extended European Search Report issued Apr. 8, 2013, by the European Patent Office in corresponding European Patent Application No. 10828176.7. (6 pages).
(Continued)

*Primary Examiner* — Mahmoud Gimie
*Assistant Examiner* — Sizo Vilakazi
(74) *Attorney, Agent, or Firm* — Buchanan Ingersoll & Rooney PC (57) ABSTRACT

A cooling system for an engine in the present invention includes a first coolant route for circulating coolant between a water jacket of an engine main body and a heater core, a second coolant route for circulating the coolant between a waste heat recovery unit and the heater core, a first water-temperature sensor provided on the first coolant route, and a second water-temperature sensor provided on the second coolant route. An engine control unit makes an engine stop determination based on the coolant temperatures detected by the first water-temperature sensor and the second water-temperature sensor and, in making the engine stop determination, selectively uses the coolant temperatures detected by the first water-temperature sensor and the second water-temperature sensor in dependence on whether a heater unit including the heater core is in an operation state or in an out-of-operation state.

9 Claims, 4 Drawing Sheets

(51) Int. Cl.
*F01P 11/02* (2006.01)
*F02N 11/08* (2006.01)
*F02D 29/02* (2006.01)
*B60W 10/02* (2006.01)
*B60W 10/06* (2006.01)
*B60W 10/08* (2006.01)
*B60W 30/192* (2012.01)
*F01P 7/16* (2006.01)
*F02D 17/04* (2006.01)
*F02G 5/02* (2006.01)
*B60W 20/00* (2006.01)

(52) U.S. Cl.
CPC ............. *B60W 30/192* (2013.01); *F01P 7/165* (2013.01); *F02D 17/04* (2013.01); *F02G 5/02* (2013.01); *F02N 11/0829* (2013.01); *F02N 11/084* (2013.01); *B60L 2240/445* (2013.01); *B60W 20/00* (2013.01); *F01P 2060/08* (2013.01); *Y02T 10/6286* (2013.01); *Y02T 10/166* (2013.01); *F01P 2050/24* (2013.01); *F02N 2200/023* (2013.01); *F02N 2200/0811* (2013.01); *Y02T 10/48* (2013.01)
USPC ..................... 701/112; 123/41.14; 123/179.4

(56) References Cited

U.S. PATENT DOCUMENTS

| | | |
|---|---|---|
| 6,782,704 B2 | 8/2004 | Kuroda et al. |
| 6,973,798 B2 | 12/2005 | Ikura et al. |
| 7,497,195 B2 * | 3/2009 | Umezu et al. ............. 123/179.4 |
| 7,698,045 B2 | 4/2010 | Jinno |
| 2002/0035972 A1 | 3/2002 | Suzuki et al. |
| 2003/0131806 A1 | 7/2003 | Suzuki et al. |
| 2004/0211381 A1 * | 10/2004 | Ogawa et al. ............. 123/179.4 |
| 2005/0193747 A1 * | 9/2005 | Kajimoto et al. ............. 62/133 |
| 2009/0063009 A1 | 3/2009 | Jinno |
| 2009/0198438 A1 * | 8/2009 | Jinno ............................ 701/110 |
| 2011/0118954 A1 * | 5/2011 | Muta ............................ 701/102 |

FOREIGN PATENT DOCUMENTS

| | | |
|---|---|---|
| EP | 2 098 392 A1 | 9/2009 |
| EP | 2 169 212 A2 | 3/2010 |
| JP | 2001-263123 A | 9/2001 |
| JP | 2001-341515 A | 12/2001 |
| JP | 2002-021626 A | 1/2002 |
| JP | 2004-084479 A | 3/2004 |
| JP | 2005-001523 A | 1/2005 |
| JP | 2005-048648 A | 2/2005 |
| JP | 2005-344646 A | 12/2005 |
| JP | 2007-230385 A | 9/2007 |
| JP | 2008-180215 A | 8/2008 |
| JP | 2008-208716 A | 9/2008 |
| JP | 2009-150266 A | 7/2009 |
| JP | 2009-208619 A | 9/2009 |
| JP | 2010-084629 A | 4/2010 |
| JP | 2010-084630 A | 4/2010 |

OTHER PUBLICATIONS

International Search Report (PCT/ISA/210) issued on Nov. 30, 2010, by Japanese Patent Office as the International Searching Authority for International Application No. PCT/JP2010/067964.

Notice of Rejection issued on Apr. 3, 2012, by Japanese Patent Office for Application No. 2009-253871 (with English translation).

* cited by examiner

ENGINE STOP DETERMINATION DEVICE AND ENGINE STOP DETERMINATION METHOD

TECHNICAL FIELD

The present invention relates to an engine stop determination device and an engine stop determination method for determining whether to permit the operation stop of an engine of a vehicle or not when the same is traveling or is stopped.

BACKGROUND ART

As prior art relating to cooling systems for vehicle engines, there is one that is provided with a heater core for heating a passenger room (refer to Patent Document 1 for example). This is provided with a first coolant route for circulating coolant between a waste heat recovery unit and the heater core and a second coolant route for circulating coolant between the waste heat recovery unit and a water jacket of an engine.

Then, based on a detection value of a water-temperature sensor provided on the first coolant route, it is carried out to circulate the coolant in the first coolant route without circulating the coolant in the second coolant route when the coolant is relatively low in temperature, and to circulate the coolant also in the second coolant route when the coolant temperature rises.

By so doing, in the aforementioned prior art, when the coolant is heated, the coolant in the water jacket is not circulated through the heater core, and thus, the engine can be prevented from being overcooled. Further, because when the coolant is heated, a large quantity of coolant is not circulated through the heater core, a heater unit including the heater core can be enhanced in heating performance.

PRIOR ART DOCUMENT

Patent Document

Patent Document 1: JP2008-208716 A

SUMMARY OF THE INVENTION

Problem to be Solved by the Invention

Presently, a vehicle capable of stopping the operation of an engine when the vehicle is traveling or is stopped has been put into practical use. This is typified by a hybrid vehicle in which an electric motor for driving wheels is provided in addition to an engine and in which the engine and the electric motor are selectively operated to drive the wheels during the traveling.

In the hybrid vehicle like this, it is often the case that the operation of the engine is stopped when the electric motor works for traveling. Usually, in the hybrid vehicle, the determination of whether to permit or inhibit the operation stop of the engine is based on the vehicle state including a vehicle speed or the presence/absence of the manipulation of an acceleration pedal. However, in addition to such a vehicle state, the state of a cooling system for the engine should be taken into consideration.

That is, if the operation stop of the engine is performed during the heating of the coolant, it results that the engine is overcooled. Further, since the heater core utilizes waste heat from the engine and exhaust gas, the heating performance of the heater unit is lowered when the operation stop of the engine is performed during the operation of the heater unit. Heretofore, there has been not any prior art relating to an engine stop determination device that executes the stop determination taking the state of the cooling system into consideration.

The present invention has been made taking the foregoing circumstances into consideration, and an object thereof is to provide an engine stop determination device and an engine stop determination method capable of optimizing the stop determination of an engine in dependence on the state of a cooling system.

Measures for Solving the Problem

In order to solve the aforementioned problem, the feature in construction of the invention in an engine stop determination device resides in that a cooling system is provided with a first coolant route for circulating coolant between a water jacket of an engine and a heater core; a second coolant route formed to merge with the first coolant route between the water jacket and the upstream side of the heater core and being for circulating the coolant between a waste heat recovery unit and the heater core; a first water-temperature sensor provided in the water jacket or between the water jacket and a shutoff valve on the first coolant route; and a second water-temperature sensor provided between a merging point on the second coolant route with the first coolant route and the heater core; and that stop determination means makes an engine stop determination based on coolant temperatures detected by the first water-temperature sensor and the second water-temperature sensor and in making the engine stop determination, selectively uses the coolant temperatures detected by the first water-temperature sensor and the second water-temperature sensor in dependence on whether a heater unit including the heater core is in an operation state or in an out-of-operation state.

FORM FOR PRACTICING THE INVENTION

Figure 1:
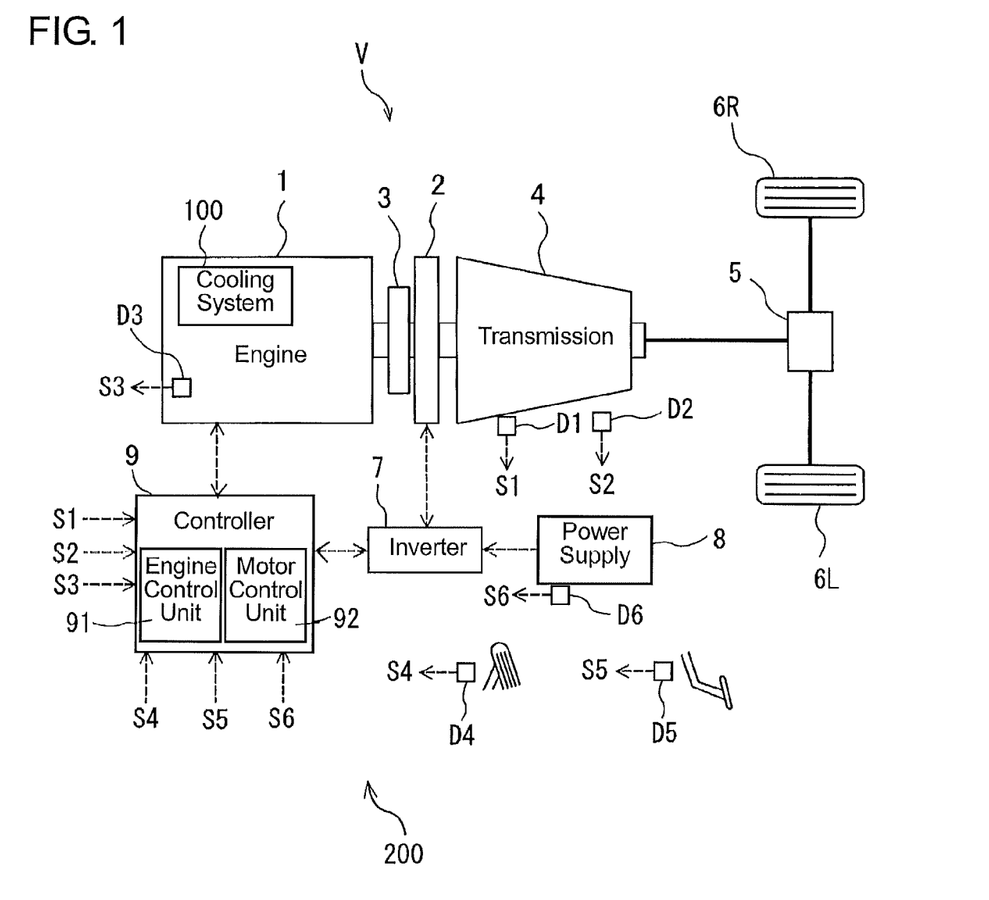
FIG. 1 is a block diagram showing a driving system of a hybrid vehicle incorporating an engine stop determination device in one embodiment according to the present invention.

An engine stop determination device 200 in one embodiment according to the present invention will be described with reference to FIGS. 1 to 4. FIG. 1 shows the outline of a power train for a hybrid vehicle (hereinafter, referred to as vehicle V) incorporating the engine stop determination device 200 in the present embodiment. In FIG. 1, thick lines indicate the mechanical connections in the vehicle V, and arrowed broken lines indicate signal lines for control.

As shown in FIG. 1, an engine 1 (corresponding to the engine in the present invention) and an electric motor 2 of the vehicle V are connected in series through a clutch device 3 being a wet multiple-disc clutch. Further, the electric motor 2 is connected to a transmission 4 of the vehicle V in series, and the transmission 4 is connected to a right driving wheel 6R and a left driving wheel 6L (both corresponding to the wheel in the present invention) of the vehicle V through a differential gear mechanism 5. Hereinafter, the right driving wheel 6R and the left driving wheel 6L are collectively referred to as the driving wheels 6R, 6L.

The engine 1 is an ordinary internal-combustion engine that generates an output power with fuel of a hydrocarbon base, and includes a cooling system 100 referred to later. The electric motor 2 is a synchronous motor for driving the wheels although not limited thereto, and the transmission 4 is an ordinary automatic transmission. Further, the clutch device 3 is a clutch device of the normally close type that ordinarily makes the connection between the engine 1 and the electric motor 2, and connects or disconnects the torque transmission between the engine 1 and the electric motor 2.

The electric motor 2 is connected with an electric power supply 8 through an inverter 7. The power supply 8 is constituted by a secondary battery, and the electric power supplied from the power supply 8 is converted by the inverter 7 into alternating current to rotationally operate the electric motor 2. Further, the generation of electricity by the electric motor 2 is charged to the power supply 8 through the inverter 7. The inverter 7 is electrically connected to a controller 9 (corresponding to the stop determination controller in the present invention). As shown in FIG. 1, the controller 9 is provided with an engine control unit 91 and a motor control unit 92, and the operation of the electric motor 2 is controlled by the motor control unit 92.

The vehicle V using the power train shown in FIG. 1 selectively operates the engine 1 and the electric motor 2 to drive the driving wheels 6R, 6L during traveling. At the time of traveling by the engine 1, the engine 1 rotates the driving wheels 6R, 6L through the transmission 4. Further, at the time of traveling by the electric motor 2, the engine 1 is stopped, and the electric motor 2 rotates the driving wheels 6R, 6L through the transmission 4. At this time, the clutch device 3 is released to release the connection between the engine 1 and the electric motor 2. Furthermore, the electric motor 2 is driven by the engine 1 through the clutch device 3 to function also as an electric generator.

As shown in FIG. 1, the controller 9 is electrically connected to the engine 1 and is supplied as inputs thereto with detection signals (respectively denoted by S1-S6 in FIG. 1) from a vehicle speed sensor D1 for the vehicle V, a shift switch D2 of the transmission 4, a throttle opening sensor D3 of the engine 1, an accelerator pedal switch D4, a brake pedal switch D5, and a voltage sensor D6 for the power supply 8 (each of D1-D6 corresponds to the vehicle state detection sensor in the present invention). The controller 9 detects the state of the vehicle V based on these detection signals.

The engine control unit 91 of the controller 9 makes a stop determination of the engine 1 based on these detector signals and determines whether to permit the operation stop of the engine 1 or not. Further, in addition to being based on these detection values, the stop determination of the engine 1 may be made based on the temperature of a catalyzer in an exhaust system and the temperature of oil in the engine.

Figure 2:
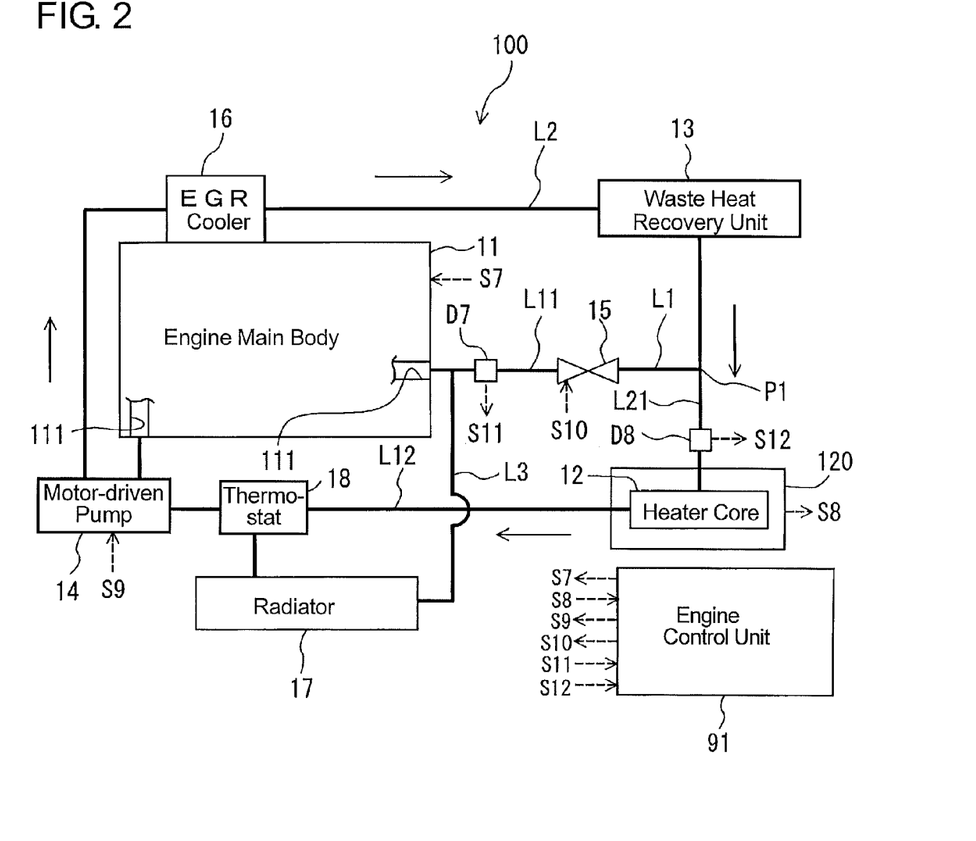
FIG. 2 is a simplified diagram showing a cooling system for an engine in the vehicle shown in FIG. 1.

FIG. 2 shows an engine main body 11 constituting the engine 1, the cooling system 100 for the engine 1 and the engine control unit 91 for controlling these components. Hereinafter, the cooling system 100 for the engine 1 will be described with reference to FIG. 2.

The engine main body 11 is composed of a cylinder block, a cylinder head, pistons, other accessories (all not shown) and the like and is provided therein with a water jacket 111 that circulates coolant being cooling water. The engine main body 11 is drivingly controlled by the engine control unit 91 of the controller 9 to be brought into rotational operation or operation stop (as indicated by S7 in FIG. 2).

A heater core 12 is included in a heater unit 120 being a heater for blowing a warm air to a passenger room. The heater core 12 is a heat exchanger and is formed therein with a water passage for enabling the coolant to pass therethrough. The heater unit 120 blows air around the water passage of the heater core 12 to heat the air through heat exchange between the air and the coolant. The heater unit 120 is provided with an operating switch provided in the passenger room, and the operation state or the out-of-operation state of the heater unit 120 is selected when the passenger manipulates the operating switch. The heater unit 120 is electrically connected to the engine control unit 91 and inputs a signal (indicated by S8 in FIG. 2) that designates a warm air temperature as a target, to the engine control unit 91.

The heater core 12 and the engine main body 11 are connected by conduits. A first coolant passage L1 (corresponding to the first coolant route in the present invention) in the form of a loop that circulates the coolant therein is formed between the water jacket 111 of the engine main body 11 and the heater core 12.

A waste heat recovery unit 13 is arranged on a passage for exhaust gas from the engine main body 11 and is provided therein with a water passage enabling the coolant to pass therethrough. The waste heat recovery unit 13 performs heat-exchange between the exhaust gas and the coolant to heat the coolant. The waste heat recovery unit 13 and the heater core 12 are connected by a conduit, and a second coolant passage L2 (corresponding to the second coolant route in the present invention) in the form of a loop that circulates the coolant therein is formed between the waste heat recovery unit 13 and the heater core 12.

Further, as shown in FIG. 2, the second coolant passage L2 merges together with the first coolant passage L1 at a connecting portion P1 (corresponding to the merging point in the present invention) located between the water jacket 111 and the upstream side of the heater core 12.

On the second coolant passage L2, a motor-driven pump 14 (corresponding to the coolant force-feed unit in the present invention) is provided on the downstream side of the heater core 12. The motor-driven pump 14 is a fluid pressure pump driven by an electric motor (not shown) and is configured to be able to operate regardless of the operation stop of the engine main body 11. The operation of the motor-driven pump 14 is controlled by the aforementioned engine control unit 91 (as indicated by S9 in FIG. 2).

A portion of the second coolant passage L2 between the connecting portion P1 and the upstream side of the motor-driven pump 14 is used in common as a portion of the first coolant passage L1, and the motor-driven pump 14 discharges the drawn coolant toward both of the water jacket 111 of the engine main body 11 and the waste heat recovery unit 13 to circulate the coolant in the first coolant passage L1 and the second coolant passage L2.

A cutoff valve 15 (corresponding to the shutoff valve in the present invention) is provided on a connection passage L11 which is located between the engine main body 11 and the connecting portion P1 on the first coolant passage L1. Although not limited to one specified particularly in kind, type and working principle, the cutoff valve 15 can be constituted by a rotary valve, a needle valve or the like. The opening and closing of the cutoff valve 15 are controlled by the engine control unit 91 (as indicated by S10 in FIG. 2) to make the connection and the blocking between the water jacket 111 and the connecting portion P1.

A first temperature sensor D7 (corresponding to a first water-temperature sensor in the present invention) is provided between the engine main body 11 and the cutoff valve 15 on the connection passage L11. The first temperature sensor D7 is a temperature sensor for detecting the coolant temperature in the connection passage L11, and a signal indicating the detection temperature is inputted to the engine control unit 91 (as indicated by S11 in FIG. 2). The first temperature sensor D7 does not need to be provided necessarily on the connection passage L11 and may be provided in the water jacket 111 of the engine main body 11.

Further, a second temperature sensor D8 (corresponding to a second water-temperature sensor in the present invention) is provided on a lead passage L21 (located on the upstream side of the heater core 12) formed between the connecting portion P1 and the heater core 12 on the second coolant passage L2. The second temperature sensor D8 is a temperature sensor for detecting the coolant temperature in the lead passage L21 and, like the first temperature sensor D7, inputs a signal (indicated by S12 in FIG. 2) indicating the detection temperature, to the engine control unit 91.

An EGR (Exhaust Gas Recirculation) cooler 16 is provided on the engine main body 11 and is provided therein with a passage for the exhaust gas from the engine main body 11. As the coolant passes around the passage for the exhaust gas, the EGR cooler 16 performs heat-exchange between the exhaust gas and the coolant to cool the exhaust gas. The cooled exhaust gas is introduced as intake air to an intake side of the engine main body 11 through an EGR valve (not shown).

Further, one end of a cooling passage L3 is connected between the engine main body 11 and the first temperature sensor D7 on the connection passage L11. The other end of the cooling passage L3 is connected to a common passage L12 to the first coolant passage L1 and the second coolant passage L2. The cooling passage L3 is provided with a known radiator 17 thereon. Furthermore, a known thermostat 18 is arranged at a connecting portion between the cooling passage L3 and the common passage L12. The thermostat 18 is brought into a valve-closing when the coolant is low in temperature and is brought into a valve-opening to make the cooling passage L3 and the common passage L12 communicate when the coolant reaches a predetermined value in temperature.

The cooling system 100 for the engine 1 is composed of the first coolant passage L1, the second coolant passage L2, the cooling passage L3, the water jacket 111 of the engine main body 11, the heater core 12, the waste heat recovery unit 13, the motor-driven pump 14, the cutoff valve 15, the EGR cooler 16, the radiator 17, the thermostat 18, the first temperature sensor D7 and the second temperature sensor D8 that are all aforementioned. In the present invention, the cooling system 100 for the engine 1 does not necessarily need all of the aforementioned components as essentials and may be constituted by selecting necessary components properly.

Next, description will be made regarding an operation method for the cooling system 100 for the engine 1. As shown in FIG. 2, for example, if the coolant is low in temperature at the time of starting of the engine 1 and if the detection values of the first temperature sensor D7 and the second temperature sensor D8 are both less than a predetermined valve-opening threshold value, the engine control unit 91 brings the cutoff valve 15 into the closed state.

Accordingly, the coolant that is force-fed by the motor-driven pump 14 does not flow in the first coolant passage L1 but circulates only in the second coolant passage L2 (as indicated by the arrowed solid line in FIG. 2). The coolant in the water jacket 111 of the engine main body 11 does not outflow to the outside and thus, is heated rapidly by the combustion heat in the engine main body 11.

The coolant circulating in the second coolant passage L2 is heated as a result of cooling the exhaust gas in the EGR cooler 16 after being discharged from the motor-driven pump 14, and is sent to the waste heat recovery unit 13. After being further heated in the waste heat recovery unit 13, the coolant reaches the heater core 12. The coolant that heated the air for ventilation in the heater core 12 (the coolant itself is cooled in the heater core 12) is drawn again by the motor-driven pump 14 through the common passage L12 and is discharged toward the EGR cooler 16.

When the coolant in the water jacket 111 is heated by the operation of the engine main body 11, the detection value of the coolant temperature by the first temperature sensor D7 becomes greater than or equal to the valve-opening threshold value. At this time, since the coolant circulating in the second coolant passage L2 is also heated by the EGR cooler 16 and the waste heat recovery unit 13, the detection value of the coolant temperature by the second temperature sensor D8 also becomes greater than or equal to the valve-opening threshold value.

Figure 3:
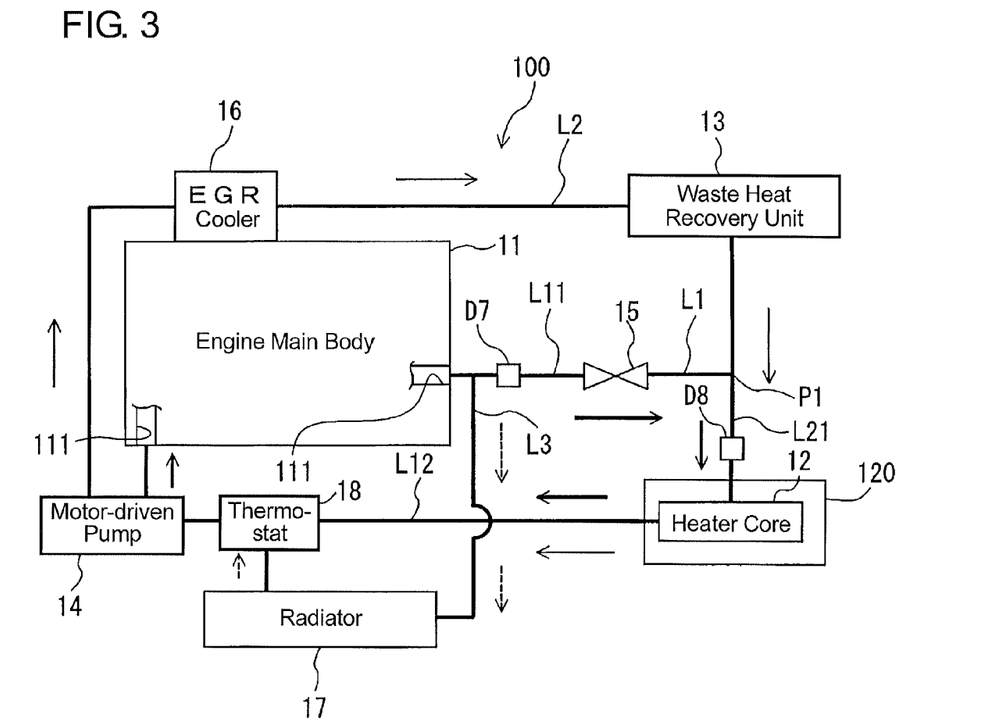
FIG. 3 is a simplified diagram showing the state that a shutoff valve is in an open state in the cooling system shown in FIG. 1.

If at least one of the detection values of the first temperature sensor D7 and the second temperature sensor D8 becomes greater than or equal to the valve-opening threshold value, the engine control unit 91 brings the cutoff valve 15 into the open state to make the water jacket 111 of the engine main body 11 and the heater core 12 communicate with each other, as shown in FIG. 3. Thus, the coolant that is force-fed by the motor-driven pump 14 circulates from the engine main body 11 to the first coolant passage L1 (as indicated by the arrowed thick line in FIG. 3) in addition to circulating in the second coolant passage L2.

Further, in a different way from that in this case, for example, the cutoff valve 15 may be brought into the open state also when a request signal for circulating the coolant from the first coolant passage L1 to the second coolant passage L2 is generated from the heater unit 120 to the controller 9 in order to make the warm air temperature rise further in the heater core 12.

The coolant circulating in the first coolant passage L1 is heated in the water jacket 111 of the engine main body 11 and then, is fed to the heater core 12 through the connection passage L11 and the lead passage L21. The coolant cooled in the heater core 12 is drawn by the motor-driven pump 14 through the common passage L12 and is discharged again toward the engine main body 11 and the EGR cooler 16.

When the thermostat 18 is brought into the valve-opening with an increase in temperature of the coolant in the common passage L12, the coolant outflows from the engine main body 11 to the cooling passage L3 and is cooled by the radiator 17 (as indicated by the arrowed broken line in FIG. 3).

Figure 4:
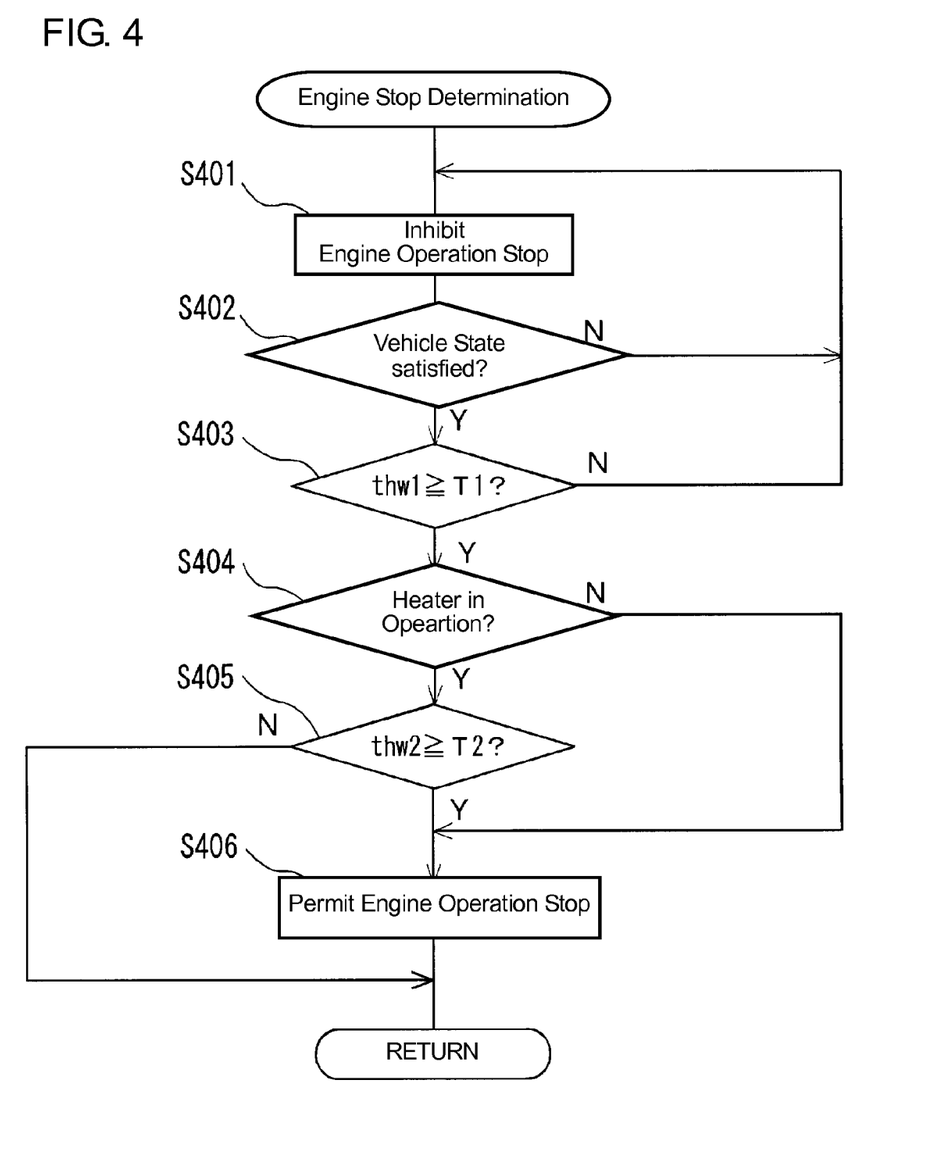
FIG. 4 is a flow chart showing a control method for engine stop determination.

Next, with reference to FIG. 4, description will be made regarding a method for stop determination of the engine 1 by the engine control unit 91. It is to be noted that the control flow chart shown in FIG. 4 is executed regardless of whether the cutoff valve 15 is in the open state or in the closed state.

In the beginning, when the controller 9 is initialized, the operation stop of the engine main body 11 is inhibited (step S401). Therefore, at this stage, except for the case where the engine main body 11 is stopped by the manipulation of the passenger, it does not occur that the engine control unit 91 executes the operation stop of the engine main body 11.

Next, the engine control unit 91 determines whether or not the state of the vehicle V satisfies predetermined conditions based on all or some of the detection signals from the vehicle speed sensor D1, the shift switch D2, the throttle opening sensor D3, the acceleration pedal switch D4, the brake pedal switch D5 and the voltage sensor D6 that are all aforementioned (step S402). The predetermined conditions are the conditions indicating that the engine main body 11 is in the state of being able to be stopped when the vehicle V is traveling or in the stop state. When the state of the vehicle V is determined not to have satisfied the predetermined conditions, return is made to step S401. That is, when the state of the vehicle V does not satisfy the predetermined conditions, the engine control unit 91 inhibits the operation stop of the engine 1 regardless of the operation state of the heater unit 120.

When the state of the vehicle V is determined to have satisfied the predetermined conditions, determination is made of whether or not the detection value thw1 of the first temperature sensor D7 regarding the coolant temperature in the connection passage L11 is greater than or equal to a predetermined threshold value T1 (corresponding to the first threshold value in the present invention) (step S403). The controller 9 infers the temperature of combustion chambers in the engine main body 11, the temperature of a catalyzer in the exhaust system and the like from the detection value thw1. If the detection value thw1 is less than the threshold value T1, return is made to the step S401.

If the detection value thw1 is greater than or equal to the threshold value T1, determination is made of whether or not the operating switch in the passenger room for the heater unit 120 has been in ON (step S404). If the operating switch for the heater unit 120 is in OFF-state, the operation stop of the engine main body 11 is permitted (step S406). Therefore, the engine control unit 91 stops supplying fuel to the combustion chambers of the engine 1 by an injection device (the injection device and the combustion chambers are both not shown) and then, stops the engine main body 11.

When the operating switch for the heater unit 120 has been in ON, determination is made of whether or not the detection value thw2 of the second temperature sensor D8 regarding the temperature of the coolant in the lead passage L21 is greater than or equal to a predetermined threshold value T2 (corresponding to the second threshold value in the present invention) (step S405). If the detection value thw2 is less than the threshold value T2, return is made to the starting step in the control flow. If the detection value thw2 is greater than or equal to the threshold value T2, on the other hand, the operation stop of the engine main body 11 is permitted (step S406). Although in the present embodiment, the threshold value T2 is set to be higher in temperature than the threshold value T1, the present invention is not limited to so setting.

According to the present embodiment, the stop determination of the engine main body 11 is made based on the coolant temperatures detected by the first temperature sensor D7 and the second temperature D8, and in making the engine stop determination, the coolant temperatures detected by the first temperature sensor D7 and the second temperature D8 are selectively used in dependence on whether the heater unit 120 is in the operation state or in the out-of-operation state, so that it is possible to optimize the stop determination of the engine 1 in dependence on the state of the cooling system 100.

Thus, the engine main body 11 can be prevented from being lowered excessively in temperature, and the heater unit 120 can be improved in heating performance.

Further, when the state of the vehicle V satisfies the predetermined conditions and when the heater unit 120 is in the out-of-operation state, the operation stop of the engine 1 is permitted if the detection value thw1 of the coolant temperature detected by the first temperature sensor D7 is greater than or equal to the threshold value T1. As a result, the coolant temperature in the water jacket 111 can be prevented from being lowered excessively.

More specifically, when the heater unit 120 is in the out-of-operation state, it is not necessary to supply the coolant at a high temperature to the heater core 12, and thus, the operation stop of the engine 1 is determined based on only the detection value thw1 of the first temperature sensor D7. Then, if the detection value thw1 of the first temperature sensor D7 is less than the threshold value T1, the operation stop of the engine 1 is inhibited, whereby the coolant temperature in the water jacket 111 is prevented from being lowered excessively.

Further, when the state of the vehicle V satisfies the predetermined conditions and when the heater unit 120 is in the operation state, the operation stop of the engine 1 is permitted if the detection value thw1 of the coolant temperature detected by the first temperature sensor D7 is greater than or equal to the threshold value T1 and if the detection value thw2 of the coolant temperature detected by the second temperature sensor D8 is greater than or equal to the threshold value T2. As a result, in addition to preventing the coolant temperature in the water jacket 111 from being lowered excessively, it is possible to prevent the heater unit 120 from being lowered in heating performance.

More specifically, when the heater unit 120 is in the operation state, it is necessary to supply the high-temperature coolant to the heater core 12. Thus, the operation stop of the engine 1 is determined based on the detection value thw2 of the second temperature sensor D8 in addition to the detection value thw1 of the first temperature sensor D7.

Then, if at least one of the detection value thw1 of the first temperature sensor D7 and the detection value thw2 of the second temperature sensor D8 is less than the threshold value T1, T2 therefor, the operation stop of the engine 1 is inhibited. As a result, the coolant temperature in the water jacket 111 is prevented from being lowered excessively, and the heater unit 120 is prevented from being lowered in heating performance.

Further, the cutoff valve 15 is closed if the coolant temperatures detected by the first temperature sensor D7 and the second temperature sensor D8 are both less than the predetermined value but is opened if at least one of the coolant temperatures detected by the first temperature sensor D7 and the second temperature sensor D8 is greater than or equal to the predetermined valve. Thus, it is possible to heat the coolant in the water jacket 111 rapidly and to enhance the heating performance by the heater unit 120.

More specifically, if both of the coolant temperatures detected by the first temperature sensor D7 and the second temperature sensor D8 are less than the predetermined value, the cutoff valve 15 is closed, whereby the coolant in the water jacket 111 is prevented from outflowing to the heater core 12. Therefore, the coolant in the water jacket 111 can be heated rapidly by the combustion heat in the engine main body 11. Further, since the coolant at a low temperature in the water jacket 111 does not reach the heater core 12, it is also possible to enhance the heating performance by the heater unit 120.

On the other hand, if at least one of the coolant temperatures detected by the first temperature sensor D7 and the second temperature sensor D8 is greater than or equal to the predetermined value, the cutoff valve 15 is opened, whereby the coolant in the water jacket 111 and the coolant in the heater core 12 are mixed together. Therefore, the coolant circulating in both of them can be heated rapidly.

The motor-driven pump 14 that is provided on the downstream side of the heater core 12 on the second coolant passage L2 is used as means for circulating the coolant, the portion between the connecting portion P1 and the upstream side of the motor-driven pump 14 is used in common to the first coolant passage L1 and the second coolant passage L2, and the motor-driven pump 14 discharges the drawn coolant toward both of the water jacket 111 and the waste heat recovery unit 13. Therefore, by the one pump, it is possible to circulate the coolant in the first coolant passage L1 and the second coolant passage L2.

Further, by using the motor-driven pump 14 as means for circulating the coolant, it is possible to circulate the coolant in the first coolant passage L1 and the second coolant passage L2 regardless of whether the engine 1 is in operation or in out-of-operation.

Furthermore, the engine stop determination device 200 in the present embodiment is provided with the electric motor 2 for driving the driving wheels 6R, 6L and is applied to the hybrid vehicle V that selectively operates the engine 1 and the electric motor 2 in order to drive the driving wheels 6R, 6L during traveling. As a result, the stop determination of the engine 1 can be optimized in dependence on the state of the cooling system 100 in the hybrid vehicle V.

Other Embodiments

The present invention is not limited to the forgoing embodiment and may be modified or broadened as described below.

The engine stop determination device according to the present invention may be applied to an idling-stop vehicle in which an engine is automatically stopped in operation when the vehicle is stopped, and is automatically restarted when the vehicle is to be restarted. Thus, in the idling-stop vehicle, the stop determination of the engine can be optimized in dependence on the state of the cooling system.

Further, means for circulating the coolant is not limited to using the single motor-driven pump 14. A water pump driven by the engine 1 and the motor-driven pump 14 may be used in combination, wherein the water pump driven by the engine 1 is brought into operation when the engine 1 is in operation, while the motor-driven pump 14 is brought into operation when the engine is stopped.

Further, the threshold value T1 for the coolant temperature used in stopping the engine main body 11 may be set to be higher in temperature than the threshold value T2. Alternatively, the threshold value T1 and the threshold value T2 may be set to be the same in temperature.

Further, when the heater unit 120 is in the out-of-operation state, the operation stop of the engine main body 11 may be permitted if the detection value thw1 of the coolant temperature in the connection passage L11 is higher than the threshold value T1 (the case of the value thw1 being equal to the threshold value T1 is not included).

Further, when the heater unit 120 is in the operation state, the operation stop of the engine main body 11 may be permitted if the detection value thw1 of the coolant temperature in the connection passage L11 is higher than the threshold value T1 (the case of the value thw1 being equal to the threshold value T1 is not included) and if the detection value thw2 of the coolant temperature in the lead passage L21 is higher than the threshold value T2 (the case of the value thw2 being equal to the threshold value T2 is not included).

Further, in the forgoing embodiment, the cutoff valve 15 is brought into the closed state if the detection values of the first temperature sensor D7 and the second temperature sensor D8 are both less than the same valve-opening threshold value. However, mutually different values may be set as respective valve-opening threshold values for the first temperature sensor D7 and the second temperature sensor D8.

Further, in the forgoing embodiment, the cutoff valve 15 is brought into the open state if at least one of the detection values of the first temperature sensor D7 and the second temperature sensor D8 becomes greater than or equal to the valve-opening threshold value. However, the cutoff valve 15 may be brought into the closed state if any one of the detection values of the first temperature sensor D7 and the second temperature sensor D8 is less than the valve-opening threshold value, but may be brought into the open state if both of the detection values of the first temperature sensor D7 and the second temperature sensor D8 become greater than or equal to the valve-opening threshold value.

Various features and many of the attendant advantages in the foregoing embodiment will be summarized as follows:

According to the engine stop determination device in the embodiment typically shown in FIGS. 2 and 4, the engine stop determination is made based on the coolant temperatures thw1, thw2 detected by the first water-temperature sensor D7 and the second water-temperature sensor D8, and in making the engine stop determination (S406), the coolant temperatures thw1, thw2 detected by the first water-temperature sensor D7 and the second water-temperature sensor D8 are selectively used in dependence on whether the heater unit 120 including the heater core 12 is in the operation state or in the out-of-operation state (step S404). Thus, it is possible to optimize the engine stop determination in dependence on the state of the cooling system 100.

Therefore, it is possible to prevent the engine temperature from being lowered excessively and to enhance the heating performance by the heater unit 120.

According to the engine stop determination device in the embodiment typically shown in FIGS. 2 and 4, when the state of the vehicle V satisfies the predetermined conditions (Y at S402) and when the heater unit 120 is in the out-of-operation state (N at S404), the operation stop of the engine 1 is permitted if the coolant temperature thw1 detected by the first water-temperature sensor D7 is greater than or equal to the first threshold value T1 (Y at S403). Thus, it is possible to prevent the coolant temperature in the water jacket 111 from being lowered excessively.

More specifically, since the supply of the coolant at a high temperature to the heater core 12 is not required when the heater unit 120 is in the out-of-operation state (N at S404), the operation stop of the engine 1 is determined based on only the coolant temperature thw1 detected by the first water-temperature sensor D7. Then, if the coolant temperature thw1 detected by the first water-temperature sensor D7 is less than the first threshold value T1 (N at S403), the operation stop of the engine 1 is inhibited (S401), so that the coolant temperature in the water jacket 111 is prevented from being lowered excessively.

According to the engine stop determination device in the embodiment typically shown in FIGS. 2 and 4, when the state of the vehicle V satisfies the predetermined conditions (Y at S402) and when the heater unit 120 is in the operation state (Y at S404), the operation stop of the engine 1 is permitted if the coolant temperature thw1 detected by the first water-temperature sensor D7 is greater than or equal to the first threshold value T1 (Y at S403) and if the coolant temperature thw2 detected by the second water-temperature sensor D8 is greater than or equal to the second threshold value T2 (Y at S405). Thus, in addition to preventing the coolant temperature in the water jacket 111 from being lowered excessively, it is possible to the prevent the heating performance by the heater unit 120 from being lowered.

More specifically, because the supply of the coolant at a high temperature to the heater core 12 is required when the heater unit 120 is in the operation state (Y at S404), the operation stop of the engine 1 is determined based on the coolant temperature thw2 detected by the second water-temperature sensor D8 in addition to the coolant temperature thw1 detected by the first water-temperature sensor D7.

Then, if at least one of the coolant temperatures thw1, thw2 detected by the first and second water-temperature sensors D7, D8 is less than the threshold value T1/T1 therefor (N at S403 or N at S405), the operation stop of the engine 1 is inhibited (S401), whereby it is realized to prevent the coolant temperature in the water jacket 111 from being lowered excessively and to prevent the heating performance by the heater unit 120 from being lowered.

According to the engine stop determination device in the embodiment typically shown in FIGS. 2 and 4, when the state of the vehicle V does not satisfy the predetermined conditions (N at S402), the operation stop of the engine 1 is inhibited (S401) regardless of the operation state of the heater unit 120. Therefore, it is possible to reliably inhibit the operation stop of the engine 1 when the state of the vehicle V except for the cooling system 100 does not satisfy the predetermined conditions (N at S402).

According to the engine stop determination device in the embodiment typically shown in FIGS. 2 and 4, the shutoff valve 15 is closed if the coolant temperature detected by the first water-temperature sensor D7 and the coolant temperature detected by the second water-temperature sensor D8 are both less than the predetermined value, but is opened when at least one of the coolant temperatures detected by the first and second water-temperature sensors D7, D8 is greater than or equal to the predetermined value. Thus, the coolant in the water jacket 111 can be heated rapidly, and the heating performance by the heater unit 120 can be enhanced.

More specifically, if the coolant temperature detected by the first water-temperature sensor D7 and the coolant temperature detected by the second water-temperature sensor D8 are both less than the predetermined value, the shutoff valve 15 is closed to prevent the coolant in the water jacket 111 from outflowing to the heater core 12, whereby the coolant in the water jacket 111 can be heated rapidly by the combustion heat of the engine 1. Further, since the coolant at a low temperature in the water jacket 111 does not reach the heater core 12, the heating performance by the heater unit 120 can be enhanced.

On the other hand, if at least one of the coolant temperatures detected by the first and second water-temperature sensors D7, D8 is greater than or equal to the predetermined value, the shutoff valve 15 is opened. As a result, the coolant in the water jacket 111 and the coolant in the heater core 12 are mixed together, so that the coolant circulated through both of them 111, 12 can be heated rapidly.

According to the engine stop determination device in the embodiment typically shown in FIGS. 2 and 4, the coolant force-feed means is the motor-driven pump 14 formed on the downstream side of the heater core 12 on the second coolant route L2, the portion L12 between the merging point P1 on the second coolant route L2 and the upstream side of the motor-driven pump 14 is in common use as a portion of the first coolant route L1, and the motor-driven pump 14 discharges drawn coolant toward both of the water jacket 111 and the waste heat recovery unit 13. Thus, the coolant in the first coolant route L1 and the second coolant route L2 can be circulated by the one pump 14.

Further, by constituting the coolant force-feed means by the motor-driven pump 14, it is possible to circulate the coolant in the first coolant route L1 and the second coolant route L2 regardless of the operation and the out-of-operation of the engine 1.

According to the engine stop determination device in the embodiment typically shown in FIGS. 1 and 2, the device is further provided with the electric motor 2 for driving the wheel 6R/6L and is applied to the hybrid vehicle V which selectively operates the engine 1 and the electric motor 2 to drive the wheel 6R/6L during traveling. Therefore, it is possible to optimize the stop determination of the engine 1 in dependence on the state of the cooling system 100 in the hybrid vehicle V.

According to the engine stop determination device in the embodiment typically shown in FIGS. 1 and 2, the device is applied to the idling-stop vehicle which automatically stops the engine 1 when the vehicle is stopped and which automatically restarts the engine 1 when the vehicle is to be restarted. Therefore, it is possible to optimize the stop determination of the engine 1 in dependence on the state of the cooling system 100 in the idling-stop vehicle.

According to the engine stop determination method in the embodiment typically shown in FIGS. 2 and 4, the method makes the engine stop determination based on the coolant temperatures thw1, thw2 detected by the first water-temperature sensor D7 and the second water-temperature sensor D8 and in making the engine stop determination, selectively uses the coolant temperatures thw1, thw2 detected by the first water-temperature sensor D7 and the second water-temperature sensor D8 in dependence on whether the heater unit 120 is in the operation state or in the out-of-operation state. Therefore, it is possible to optimize the stop determination of the engine 1 in dependence on the state of the cooling system 100.

INDUSTRIAL APPLICABILITY

An engine stop determination device and an engine stop determination method according to the present invention are applicable to a four-wheel vehicle, a two-wheel vehicle and other vehicles each being a hybrid vehicle or an idling-stop vehicle.

The invention claimed is:
1. An engine stop determination device comprising:
an engine for driving a wheel;
at least one vehicle state detection sensor for detecting the state of the vehicle; and
a stop determination controller configured to make an engine stop determination based on a detected state of the vehicle for determining whether to permit an operation stop of the engine or not;
wherein the engine includes a cooling system, and the cooling system comprises:
a first coolant route for circulating coolant between a water jacket of the engine and a heater core;
a second coolant route formed to merge with the first coolant route between the water jacket and an upstream side of the heater core and being for circulating the coolant between a waste heat recovery unit and the heater core;
a coolant force-feed unit being able to circulate the coolant in the first coolant route and the second coolant route even when the engine is in an operation stop;
a shutoff valve provided on the first coolant route and being opened and closed between the water jacket and a merging point with the second coolant route;
a first water-temperature sensor provided in the water jacket or between the water jacket and the shutoff valve on the first coolant route; and
a second water-temperature sensor provided between the merging point on the second coolant route with the first coolant route and the heater core; and
wherein the stop determination controller is configured:
to perform the engine stop determination based on coolant temperatures detected by the first water-temperature sensor and the second water-temperature sensor, and to selectively use, in making the engine stop determination, the coolant temperatures detected by the first water-temperature sensor and the second water-temperature sensor in dependence on whether a heater unit including the heater core is in an operation state or in an out-of-operation state.

2. The engine stop determination device as set forth in claim 1, wherein the stop determination controller is configured to permit the operation stop of the engine if the coolant temperature detected by the first water-temperature sensor is greater than or equal to a first threshold value when the state of the vehicle satisfies predetermined conditions and when the heater unit is in an out-of-operation state.

3. The engine stop determination device as set forth in claim 1, wherein the stop determination controller is configured to permit the operation stop of the engine if the coolant temperature detected by the first water-temperature sensor is greater than or equal to a first threshold value and if the coolant temperature detected by the second water-temperature sensor is greater than or equal to a second threshold value when the state of the vehicle satisfies predetermined conditions and when the heater unit is in an operation state.

4. The engine stop determination device as set forth in claim 1, wherein the stop determination controller is configured to inhibit the operation stop of the engine regardless of the operation state of the heater unit when the state of the vehicle does not satisfy predetermined conditions.

5. The engine stop determination device as set forth in claim 1, wherein the shutoff valve is closed if the coolant temperature detected by the first water-temperature sensor and the coolant temperature detected by the second water-temperature sensor are both less than a predetermined value, but is opened if at least one of the coolant temperature detected by the first water-temperature sensor and the coolant temperature detected by the second water-temperature sensor is greater than or equal to the predetermined value.

6. The engine stop determination device as set forth in claim 1, wherein:
 the coolant force-feed unit comprises a motor-driven pump provided on a downstream side of the heater core on the second coolant route;
 a portion between the merging point on the second coolant route and an upstream side of the motor-driven pump is in common use as a portion of the first coolant route; and
 the motor-driven pump is configured to discharge drawn coolant toward both of the water jacket and the waste heat recovery unit.

7. The engine stop determination device as set forth in claim 1, further comprising an electric motor for driving the wheel, and wherein the device is applied to a hybrid vehicle which is configured to selectively operate the engine and the electric motor for driving the wheel during traveling.

8. The engine stop determination device as set forth in claim 1, wherein the device is applied to an idling-stop vehicle which is configured to automatically stop the engine when the vehicle is stopped, and to automatically restart the engine when the vehicle is to be restarted.

9. An engine stop determination method for a vehicle comprising:
 an engine for driving a wheel; and
 at least one vehicle state detection sensor for detecting the state of the vehicle;
 the method being for making an engine stop determination based on a detected state of the vehicle to determine whether to permit an operation stop of the engine or not;
 wherein the engine includes a cooling system, and the cooling system comprises:
 a first coolant route for circulating coolant between a water jacket of the engine and a heater core;
 a second coolant route formed to merge with the first coolant route between the water jacket and an upstream side of the heater core and being for circulating the coolant between a waste heat recovery unit and the heater core;
 a coolant force-feed unit being able to circulate the coolant in the first coolant route and the second coolant route even when the engine is in an operation stop;
 a shutoff valve provided on the first coolant route and being opened and closed between the water jacket and a merging point with the second coolant route;
 a first water-temperature sensor provided in the water jacket or between the water jacket and the shutoff valve on the first coolant route; and
 a second water-temperature sensor provided between the merging point on the second coolant route with the first coolant route and the heater core;
 the method comprising the steps of:
 making the engine stop determination based on the coolant temperatures detected by the first water-temperature sensor and the second water-temperature sensor; and
 in making the engine stop determination, selectively using the coolant temperatures detected by the first water-temperature sensor and the second water-temperature sensor in dependence on whether a heater unit including the heater core is in an operation state or in an out-of-operation state.

\* \* \* \* \*

UNITED STATES PATENT AND TRADEMARK OFFICE
CERTIFICATE OF CORRECTION

PATENT NO. : 8,972,154 B2  
APPLICATION NO. : 13/505096  
DATED : March 3, 2015  
INVENTOR(S) : Naoto Yumisashi et al.

It is certified that error appears in the above-identified patent and that said Letters Patent is hereby corrected as shown below:

Title Page, item (73) Assignee change "Aisin Kabushiki Kaisha" to --Aisin Seiki Kabushiki Kaisha--.

Signed and Sealed this  
Nineteenth Day of January, 2016

Michelle K. Lee  
*Director of the United States Patent and Trademark Office*